US012718109B2

(12) United States Patent
Rizvi et al.

(10) Patent No.: US 12,718,109 B2
(45) Date of Patent: Aug. 25, 2026

(54) VALIDATION OF ITEM UPDATES USING MACHINE LEARNING TO SAMPLE DATA

(71) Applicant: Maplebear Inc., San Francisco, CA (US)

(72) Inventors: Syed Wasi Hasan Rizvi, Toronto (CA); Charles Wesley, San Diego, CA (US)

(73) Assignee: Maplebear Inc., San Francisco, CA (US)

(*) Notice: Subject to any disclaimer, the term of this patent is extended or adjusted under 35 U.S.C. 154(b) by 656 days.

(21) Appl. No.: 18/306,556

(22) Filed: Apr. 25, 2023

(65) Prior Publication Data

US 2023/0359901 A1 Nov. 9, 2023

Related U.S. Application Data

(60) Provisional application No. 63/339,948, filed on May 9, 2022.

(51) Int. Cl.
*G06N 20/00* (2019.01)
*G06F 16/23* (2019.01)
*G06N 3/09* (2023.01)

(52) U.S. Cl.
CPC ............... *G06N 3/09* (2023.01); *G06N 20/00* (2019.01); *G06F 16/23* (2019.01)

(58) Field of Classification Search
None
See application file for complete search history.

(56) References Cited

U.S. PATENT DOCUMENTS 11,120,364 B1 * 9/2021 Gokalp .................. G06N 20/00
2020/0380570 A1 * 12/2020 Ramakrishnan ... G06Q 20/4016
2021/0248509 A1 * 8/2021 Wan ....................... G06N 20/00
2022/0043976 A1 * 2/2022 Picinini ............... G06F 16/9538

* cited by examiner

*Primary Examiner* — Xuyang Xia
(74) *Attorney, Agent, or Firm* — Fenwick & West LLP

(57) ABSTRACT

An online system validates item updates using a machine-learning model to identify item updates that need independent review. The online system maintains an item database that has item entries for items on the online system. The online system receives item updates from an item update system and applies an error prediction model to the item updates to generate an error likelihood score for each item update. The online system samples a subset of the item updates based on the error likelihood scores and passes these sampled item updates to a human reviewer system. The human reviewer system labels each of the sampled item updates with an error label indicating whether the corresponding item update is actually erroneous. The online system determines whether to update the item database with the full set of received item updates based on the error labels.

20 Claims, 4 Drawing Sheets

VALIDATION OF ITEM UPDATES USING MACHINE LEARNING TO SAMPLE DATA

CROSS REFERENCE TO RELATED APPLICATION

This application claims the benefit of U.S. Provisional Application No. 63/339,948, filed May 9, 2022, which is incorporated by reference in its entirety.

BACKGROUND

Online systems, such as online concierge systems, often maintain a catalog database that contains entries for items, such as products available for sale, along with information about the products. The items in the catalog can change frequently, so an online system must periodically update its catalog, e.g., by removing products from it, adding new products to it, or updating information about existing products in the catalog. This updating is often done manually, which can be a huge task if the catalog is large or the products change frequently.

For this reason, online systems may employ third-party outsourcing vendors to update portions of their catalogs. These updates may be received periodically (e.g., daily) in an update file to be merged with the catalog. But updating the catalog automatically with the third-party data causes problems when there are errors in that data, and it can be difficult to maintain quality control for third-party work product. Accordingly, there is a need for online systems to be able to measure the performance of different third-party outsourcing vendors and control the use of their data based on the quality, which can change over time.

SUMMARY

In accordance with one or more aspects of the disclosure, an online system validates item updates using a machine-learning model to identify item updates that need independent review. The online system maintains an item database that has item entries for items on the online system. Each item entry has item data describing the corresponding item. The online system receives item updates from an item update system, where each item update contains an update to an item entry in the item database. The online system applies an error prediction model to the item updates to generate an error likelihood score for each item update. An error likelihood score represents a likelihood that an item update is erroneous in some way. The online system samples a subset of the item updates based on the error likelihood scores and passes these sampled item updates to a human reviewer system. The human reviewer system labels each of the sampled item updates with an error label indicating whether or not the corresponding item update is actually erroneous. The online system determines whether to update the item database with the full set of received item updates based on the error labels. If the online system determines to update the item database (e.g., because an error rate of the sampled item updates is below some threshold), the online system updates one or more item entries in the item database based on the item updates. If the online system determines not to update the item database, the online system may perform a corrective action, such as sending the item updates back to the item update system to be reviewed and corrected.

By providing just a set of sampled item updates to the human reviewer system, rather than all item updates, the limited human resources of the human reviewer system can be focused on those item updates that are deemed to be the most at risk for error, as determined by the trained error prediction model, which performs the initial pass on data quality. Furthermore, the online system can use the error labels from the human reviewer system to generate additional training examples to further refine the error prediction model, thereby improving the automation of the review of the item updates.

DETAILED DESCRIPTION

Figure 1:
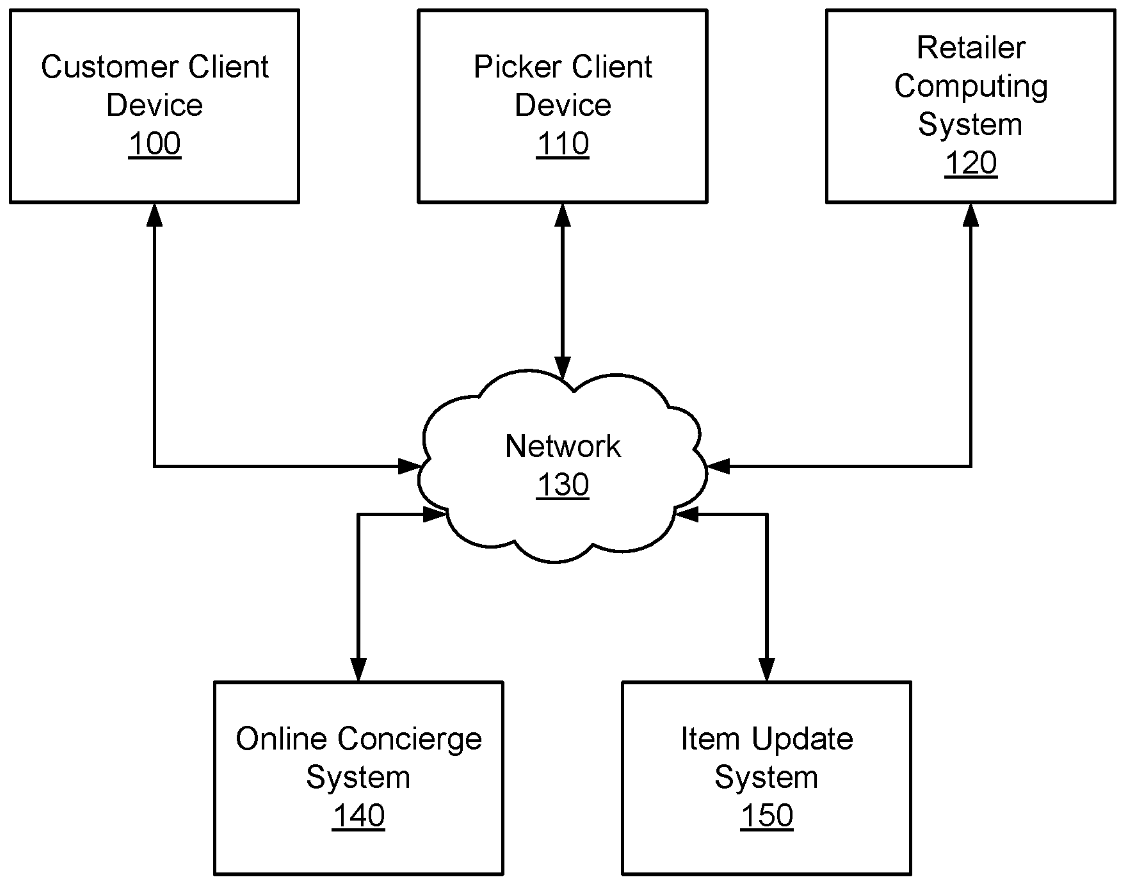
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

The item update system 150 is a system that generates item updates for the online concierge system 140. An item update includes a change or update to apply to an item entry. For example, an item update may include new item data to replace the item data in an item entry, may indicate changes to be made to item data in an item entry, or may indicate a removal of an item entry. The item update system 150 may receive data from retailers, customers, or pickers to generate the item updates. The item update system 150 may automatically generate item updates based on this received data (e.g., using a machine-learning model) or may generate item updates using human operators that review the received data. While FIG. 1 depicts the item update system 150 as separate from the online concierge system 140, in alternative embodiments, the item update system is part of the online concierge system 140. Additionally, while FIG. 1 depicts a single item update system 150, the online concierge system 140 may receive item updates from multiple item update systems 150.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
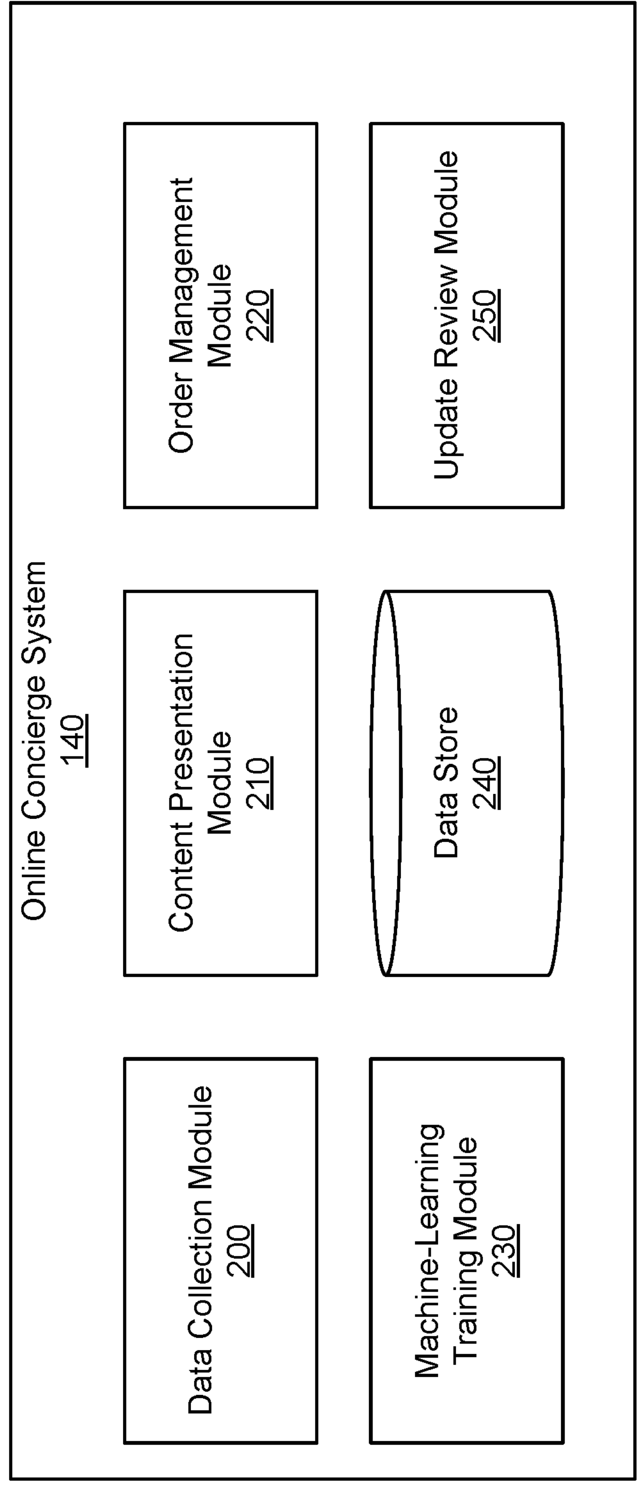
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The update review module 250 validates item updates using a machine-learning model to identify item updates that need independent review. The online system maintains an item database that has item entries for items on the online system (e.g., in data store 240). The update review module 250 receives item updates from an item update system and applies an error prediction model to the item updates to generate an error likelihood score for each item update. The update review module 250 samples a subset of the item updates based on the error likelihood scores and passes these sampled item updates to a human reviewer system. The human reviewer system labels each of the sampled item updates with an error label indicating whether the corresponding item update is actually erroneous. The update review module 250 determines whether to update the item database with the full set of received item updates based on the error labels. A method for validating item updates is described in further detail below.

Figure 3:
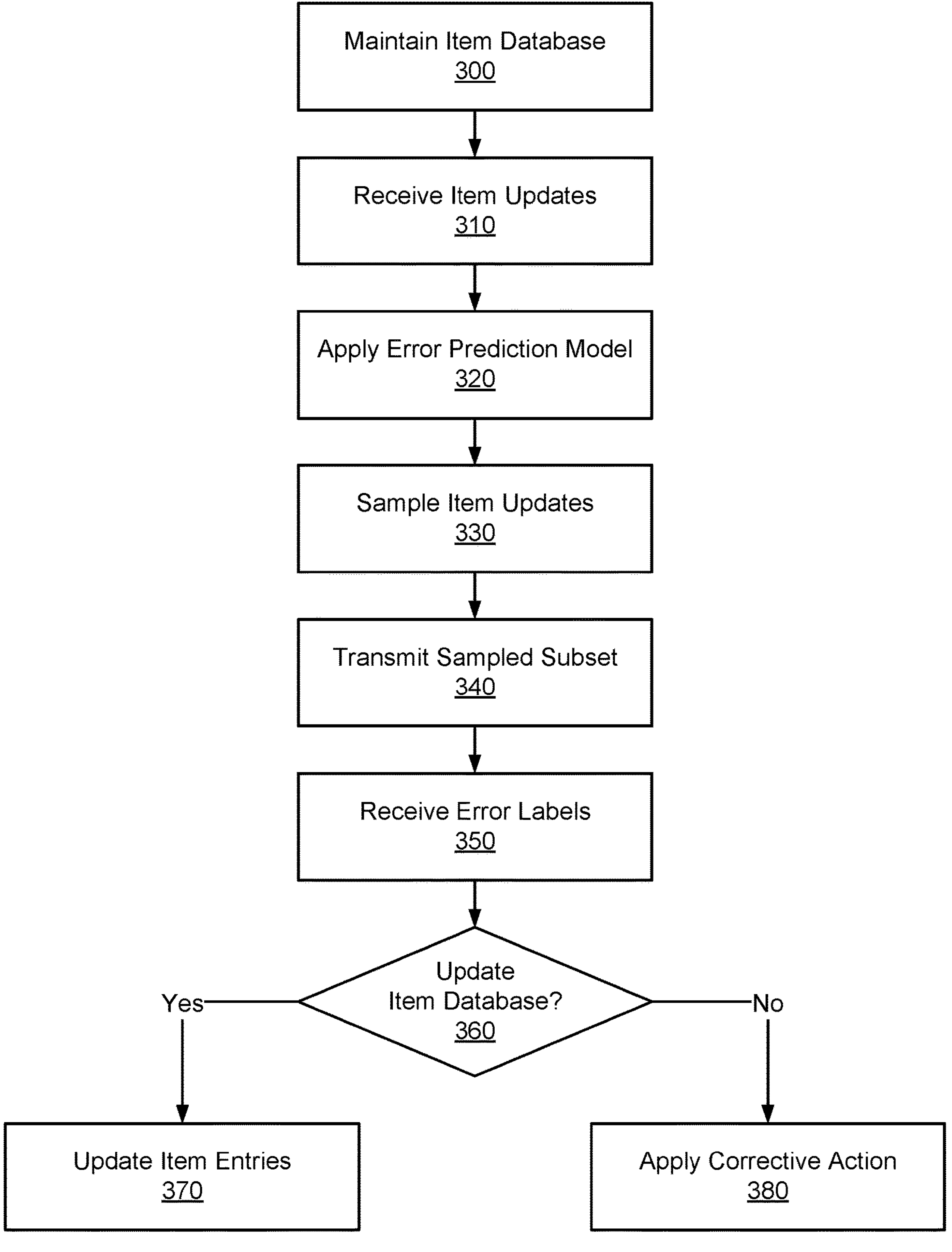
FIG. 3 is a flowchart for a method of validating item updates using machine learning, in accordance with one or more embodiments.

FIG. 3 is a flowchart for a method of validating item updates using machine learning, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system maintains 300 an item database. The item database stores item entries for the items that are available for ordering through the online concierge system. Each item entry stores item data describing characteristics of an item. For example, an item entry may store item data such as size, color, weight, stock keeping unit (SKU), or serial number for the item. The item data also may include item identifiers for items that are available and may include quantities of items associated with each item identifier. The online concierge system may store the item database in a data store (e.g., data store 240).

The online concierge system receives 310 item updates from an item update system. An item update includes a change or update to apply to an item entry. For example, an item update may include new item data to replace the item data in an item entry, may indicate changes to be made to item data in an item entry, or may indicate a removal of an item entry. The online concierge system receives these item updates from an item update system (e.g., item update system 150), which is a system that generates item updates for the online concierge system.

The online concierge system applies 320 an error prediction model to each of the item updates. An error prediction model is a machine-learning model (e.g., a neural network) that is trained to generate an error likelihood score for an item update. An error likelihood score represents a likelihood that an item update is erroneous (i.e., that the item update does not accurately reflect item data for an item). The error prediction model is trained based on a set of training examples. Each of these training examples includes an example item update and is labeled with an indication of whether the item update is erroneous. The training examples may also include information about the item update system, such as which item update system provided the item update or historical information (e.g., error rate) of the item update system that generated the item update.

The online concierge system samples 330 the item updates based on the error likelihood scores generated by the error prediction model. To generate the sampled subset, the online concierge system may select all item updates with error likelihood scores that exceed some threshold value. Similarly, the online concierge system may rank the item updates based on their error likelihood scores and sample the top n item updates or the top nth percentile of item updates. In some embodiments, the online concierge system samples from the item updates randomly but weights the selection based on the error likelihood scores of each of the item updates. The online concierge system also may only sample from the item updates if a cumulative error likelihood score (e.g., a sum or an average) exceeds some threshold value.

The online concierge system transmits 340 the sampled subset of item updates to a human reviewer system and receives 350, from the human reviewer system, error labels for the sampled subset of item updates. The human reviewer system is a system that allows for human reviewers to review item updates and label the item updates with an indication of whether the item update is correct. Each item update may be sent to multiple human reviewers, where the item update is declared to be erroneous or not based on a majority vote of the reviewers. If a reviewer marks an item update as having an error, the reviewer may further mark a reason for the error or may provide the correct data for the item. The human reviewer system may be part of the online concierge system or may be a third-party system in communication with the online concierge system.

In some embodiments, the online concierge system uses the error labels from the human reviewer system to generate additional training examples for the error prediction model. For example, the online concierge system may generate a training example for each item update in the sample subset of item updates, and may label each training example using the error label from the human review system. The online concierge system may retrain the error prediction model based on the additional training examples.

The online concierge system determines 360, based on the error labels of the sampled subset from the human reviewer system, whether to update the item database with the item updates. For example, the online concierge system may determine an error rate of the sampled subset and only update the item database with the plurality of item updates if the error rate is below some threshold value. If the online concierge system determines to update the item database, the online concierge system updates 370 one or more item entries in the item database based on one or more corresponding item updates. For example, the online concierge system may add, remove, or replace item data stored in item entries in the item database based on the item updates.

If the online concierge system determines 360 not to update the item database, the online concierge system applies 380 a corrective action to the plurality of item updates. For example, the online concierge system may reject all of the item updates and notify the item update system of the corrective action so that the item update system can send corrected item updates to the online concierge system. In some embodiments, rather than rejecting all of the item updates, the online concierge system only rejects item updates with error likelihood scores above some threshold value. This threshold value may be lower than a threshold value used to determine whether to sample an item update for human review. If the online concierge system receives corrected item updates from the item update system, the online concierge system may sample from the corrected item updates by applying the error prediction model to the correct item updates. The online concierge system may use a lower threshold value when sampling the corrected item updates to ensure that the item updates have been properly corrected. Alternatively, the online concierge system may transmit all of the corrected item updates to the human reviewer system for review.

As described above, applications operating within the online concierge system use item data to perform certain functionalities. For example, the online concierge system uses item data to serve items to customers so customers can select items to add to an order. Different applications within the online concierge system may require different levels of confidence that the item data is accurate to perform their functionalities. To ensure that applications that require high levels of confidence in item data accuracy do not use inaccurate item data, the online concierge system may generate a task list that indicates whether an item update is being processed (as described above), which an application can check before requesting item data from the item database.

For example, the online concierge system may generate a task for each item update received from an item update system and add the tasks to the task list. If the online concierge system determines that the item database should be updated based on the received item updates, the online concierge system removes the tasks from the task list. However, if the online concierge system determines not to update the item database based on the item updates, the online concierge system may maintain the corresponding tasks on the task list until the online concierge system has received corrected item updates from the item update system or applied other corrective actions as described above. If an application operating on the online concierge system requires a high level of confidence in the accuracy of item data from the item database, the application may check the task list to determine whether there are any tasks on the task list that correspond to item entries the application is requesting from the item database. If the application determines that there is a task on the task list that corresponds to an item entry the application is requesting, the application may wait until the task is removed from the task list to ensure that the item data in the item database is up to date. Alternatively, the application may use the item data in the item entry before the item update is applied.

Figure 4:
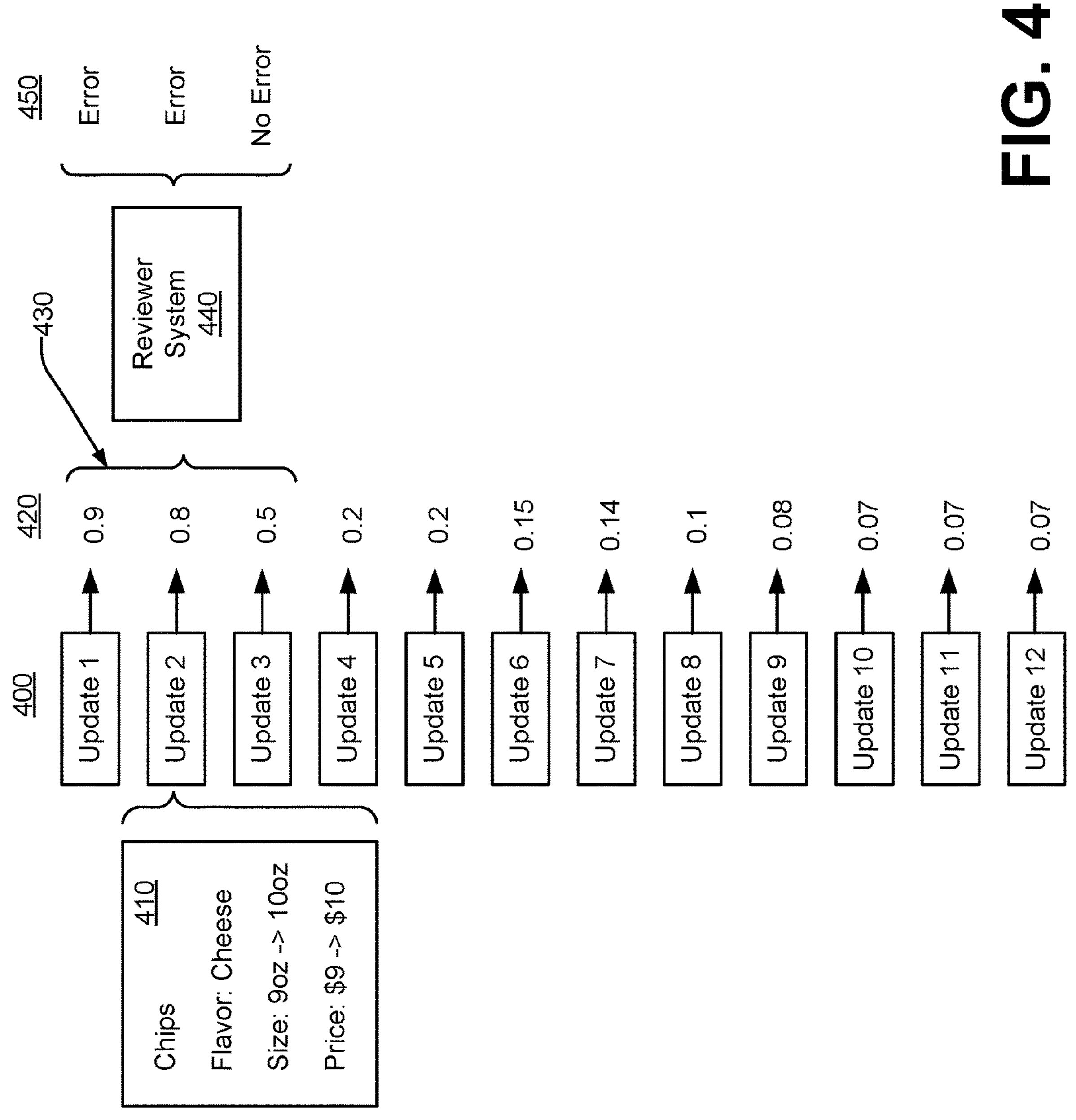
FIG. 4 illustrates an example set of item updates 400 that an online concierge system validates using a machine-learning model, in accordance with some embodiments.

FIG. 4 illustrates an example set of item updates 400 that an online concierge system validates using a machine-learning model, in accordance with some embodiments. Each of the item updates 400 includes changes to be made to item data stored in an item entry of the online concierge system's item database. For example, Update 2 includes an update 410 for a "chips" item that updates the item entry to indicate that the item is now 10 oz from 9 oz and that the price of the item is now $10 from $9.

The online concierge system generates error likelihood scores 420 for each of the item updates 400 and samples a subset 430 to be passed to a human reviewer system 440. The human reviewer system 440 determines whether each of the item updates in the sampled subset 430 contain erroneous information and generates error labels 450 accordingly. As described above, the online concierge system uses these error labels 450 to determine whether to update an item database with the item updates 400.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

maintaining, by an online system, an item database that stores therein a plurality of item entries, each item entry comprising item data describing characteristics of an item of a plurality of items;

receiving a plurality of item updates from an item update system, wherein each item update of the plurality of item updates includes a change to apply to an item entry of the plurality of item entries;

applying a trained error prediction model to each item update of the plurality of item updates to generate an error likelihood score for each of the item updates, wherein the error prediction model is trained based on a plurality of training examples that each comprise an example item update and a label indicating whether the example item update is erroneous;

sampling a subset of the item updates based on the error likelihood scores;

transmitting the sampled subset of item updates to a human reviewer system;

receiving, from the human reviewer system, a plurality of error labels for the sampled subset of item updates, wherein each error label indicates whether an item update of the sampled subset of item updates contains accurate information;

generating a task list comprising a plurality of tasks, wherein each task in the plurality of tasks corresponds to an item update in the plurality of item updates;

accessing the task list by an application executing on the online system;

determining, by the application, whether to use the plurality of item updates based on the plurality of tasks in the task list;

responsive to determining to use the plurality of item updates, retrieving the plurality of item updates from the item database by the application;

determining, based on the plurality of error labels for the sampled subset of item updates, whether to update the item database based on the plurality of item updates, wherein determining whether to update the item database comprises:

determining whether an error rate for the plurality of error labels exceeds a threshold value; and responsive to determining to update the item database, updating an item entry of the item database based on an item update of the plurality of item updates, wherein updating the item entry of the item database based on the item update comprises:

removing a task from the task list corresponding to the item update.

2. The method of claim 1, wherein each item update of the plurality of item updates comprises at least one of: item data to add to an item entry, item data to replace item data in an existing item entry, an indication to remove item data from an item entry, and an indication to remove an item entry from the item database.

3. The method of claim 1, further comprising:

generating a new set of training examples based on the sampled subset of item updates and the received error labels; and retraining the error prediction model based on the new set of training examples.

4. The method of claim 1, wherein sampling a subset of item updates comprises:

randomly selecting a subset of the plurality of item updates, wherein the subset is randomly selected based on a weighting of the item updates based on the error likelihood score corresponding with each item update of the plurality of item updates.

5. The method of claim 1, wherein sampling the subset of item updates comprises:

ranking the item updates based on the error likelihood scores; and selecting the sampled subset of item updates based on the ranking.

6. The method of claim 1, wherein sampling the subset of item updates comprises:

computing a cumulative error likelihood score for the plurality of item updates based on the error likelihood scores of the item updates; and responsive to the cumulative error likelihood score exceeding a threshold value, sampling the subset of item updates.

7. The method of claim 1, wherein sampling the subset of item updates comprises:

identifying a subset of the plurality of item updates with error likelihood scores that exceed a threshold value.

8. The method of claim 1, further comprising:

responsive to determining not to update the item database, applying a corrective action to the plurality of item updates.

9. The method of claim 8, wherein applying the corrective action comprises:

notifying the item update system of the corrective action; and receiving a plurality of corrected item updates from the item update system.

10. The method of claim 8, wherein applying the corrective action comprises:

updating a subset of the plurality of item entries based on a subset of the plurality of item updates, wherein each item update of the subset of item updates is associated with an error likelihood score that is less than a threshold value.

11. A non-transitory computer-readable medium storing instructions that, when executed by a processor, cause the processor to perform operations comprising:

maintaining, by an online system, an item database that stores therein a plurality of item entries, each item entry comprising item data describing characteristics of an item of a plurality of items;

receiving a plurality of item updates from an item update system, wherein each item update of the plurality of item updates includes a change to apply to an item entry of the plurality of item entries;

applying a trained error prediction model to each item update of the plurality of item updates to generate an error likelihood score for each of the item updates, wherein the error prediction model is trained based on a plurality of training examples that each comprise an example item update and a label indicating whether the example item update is erroneous;

sampling a subset of the item updates based on the error likelihood scores;

transmitting the sampled subset of item updates to a human reviewer system;

receiving, from the human reviewer system, a plurality of error labels for the sampled subset of item updates, wherein each error label indicates whether an item update of the sampled subset of item updates contains accurate information;

generating a task list comprising a plurality of tasks, wherein each task in the plurality of tasks corresponds to an item update in the plurality of item updates;

accessing the task list by an application executing on the online system;

determining, by the application, whether to use the plurality of item updates based on the plurality of tasks in the task list;

responsive to determining to use the plurality of item updates, retrieving the plurality of item updates from the item database by the application;

determining, based on the plurality of error labels for the sampled subset of item updates, whether to update the item database based on the plurality of item updates, wherein determining whether to update the item database comprises:

determining whether an error rate for the plurality of error labels exceeds a threshold value; and responsive to determining to update the item database, updating an item entry of the item database based on an item update of the plurality of item updates, wherein updating the item entry of the item database based on the item update comprises:

removing a task from the task list corresponding to the item update.

12. The computer-readable medium of claim 11, wherein each item update of the plurality of item updates comprises at least one of: item data to add to an item entry, item data to replace item data in an existing item entry, an indication to remove item data from an item entry, and an indication to remove an item entry from the item database.

13. The computer-readable medium of claim 11, further storing instructions that, when executed by a processor, cause the processor to perform operations comprising:

generating a new set of training examples based on the sampled subset of item updates and the received error labels; and retraining the error prediction model based on the new set of training examples.

14. The computer-readable medium of claim 11, wherein sampling a subset of item updates comprises:

randomly selecting a subset of the plurality of item updates, wherein the subset is randomly selected based on a weighting of the item updates based on the error likelihood score corresponding with each item update of the plurality of item updates.

15. The computer-readable medium of claim 11, wherein sampling the subset of item updates comprises:

ranking the item updates based on the error likelihood scores; and selecting the sampled subset of item updates based on the ranking.

16. The computer-readable medium of claim 11, wherein sampling the subset of item updates comprises:

computing a cumulative error likelihood score for the plurality of item updates based on the error likelihood scores of the item updates; and responsive to the cumulative error likelihood score exceeding a threshold value, sampling the subset of item updates.

17. The computer-readable medium of claim 11, wherein sampling the subset of item updates comprises:

identifying a subset of the plurality of item updates with error likelihood scores that exceed a threshold value.

18. The computer-readable medium of claim 11, further storing instructions that, when executed by a processor, cause the processor to perform operations comprising:

responsive to determining not to update the item database, applying a corrective action to the plurality of item updates.

19. The computer-readable medium of claim 18, wherein applying the corrective action comprises:

notifying the item update system of the corrective action; and receiving a plurality of corrected item updates from the item update system.

20. A system comprising a processor and a non-transitory computer-readable medium storing instructions that, when executed by the processor, cause the processor to perform operations comprising:

maintaining, by an online system, an item database that stores therein a plurality of item entries, each item entry comprising item data describing characteristics of an item of a plurality of items;

receiving a plurality of item updates from an item update system, wherein each item update of the plurality of item updates includes a change to apply to an item entry of the plurality of item entries;

applying a trained error prediction model to each item update of the plurality of item updates to generate an error likelihood score for each of the item updates, wherein the error prediction model is trained based on a plurality of training examples that each comprise an example item update and a label indicating whether the example item update is erroneous;

sampling a subset of the item updates based on the error likelihood scores;

transmitting the sampled subset of item updates to a human reviewer system;

receiving, from the human reviewer system, a plurality of error labels for the sampled subset of item updates, wherein each error label indicates whether an item update of the sampled subset of item updates contains accurate information;

generating a task list comprising a plurality of tasks, wherein each task in the plurality of tasks corresponds to an item update in the plurality of item updates;

accessing the task list by an application executing on the online system;

determining, by the application, whether to use the plurality of item updates based on the plurality of tasks in the task list;

responsive to determining to use the plurality of item updates, retrieving the plurality of item updates from the item database by the application;

determining, based on the plurality of error labels for the sampled subset of item updates, whether to update the item database based on the plurality of item updates, wherein determining whether to update the item database comprises:

determining whether an error rate for the plurality of error labels exceeds a threshold value; and responsive to determining to update the item database, updating an item entry of the item database based on an item update of the plurality of item updates, wherein updating the item entry of the item database based on the item update comprises:

removing a task from the task list corresponding to the item update.

* * * * *